United States Patent

Leiber et al.

[15] 3,645,584

[45] Feb. 29, 1972

[54] FLUID RETURN CIRCUIT FOR ANTILOCKING BRAKE SYSTEMS

[72] Inventors: Heinz Leiber, Leimen; Fritz Krumling, Leimen-Lingental, both of Germany

[73] Assignee: Teldix GmbH, Heidelberg, Germany

[22] Filed: July 8, 1969

[21] Appl. No.: 839,905

[30] Foreign Application Priority Data

July 8, 1968 Germany ......................P 17 55 906.7

[52] U.S. Cl. ..........................303/21 F, 188/181 A, 303/10, 303/61

[51] Int. Cl. ..........................B60t 8/02

[58] Field of Search..................303/21, 24, 6, 6 C, 10, 61–63, 303/68–69; 188/181

[56] References Cited

UNITED STATES PATENTS

| | | | |
|---|---|---|---|
| 3,276,822 | 10/1966 | Lister et al. | 303/21 X |
| 3,495,880 | 2/1970 | Gratsch | 303/21 |
| 3,521,934 | 7/1970 | Leiber | 303/21 |
| 3,523,713 | 8/1970 | Okamoto et al. | 303/21 |
| 3,524,684 | 8/1970 | Skoyles | 303/21 |

*Primary Examiner*—Milton Buchler
*Assistant Examiner*—John J. McLaughlin
*Attorney*—Spencer & Kaye

[57] ABSTRACT

The fluid return circuit in an antilocking control system for vehicle brakes includes a pump constructed to prevent introduction of air into the brake fluid system. The pump is of the positive displacement-type and includes a piston and a drive for the piston. The drive is arranged so that it operates the piston only during the working or pumping stroke and has no effect on the piston during the return or inlet stroke. Instead, the return stroke of the piston is effected only as a consequence of the presence of fluid to be returned.

11 Claims, 6 Drawing Figures

16
1
I
O
W
18
14
2
+
5
4
6
3
13
9
8
15
10
12
11
M
7

*INVENTORS:*
Heinz Leiber
Fritz Krümling
*BY* Spencer & Kaye
Attorneys

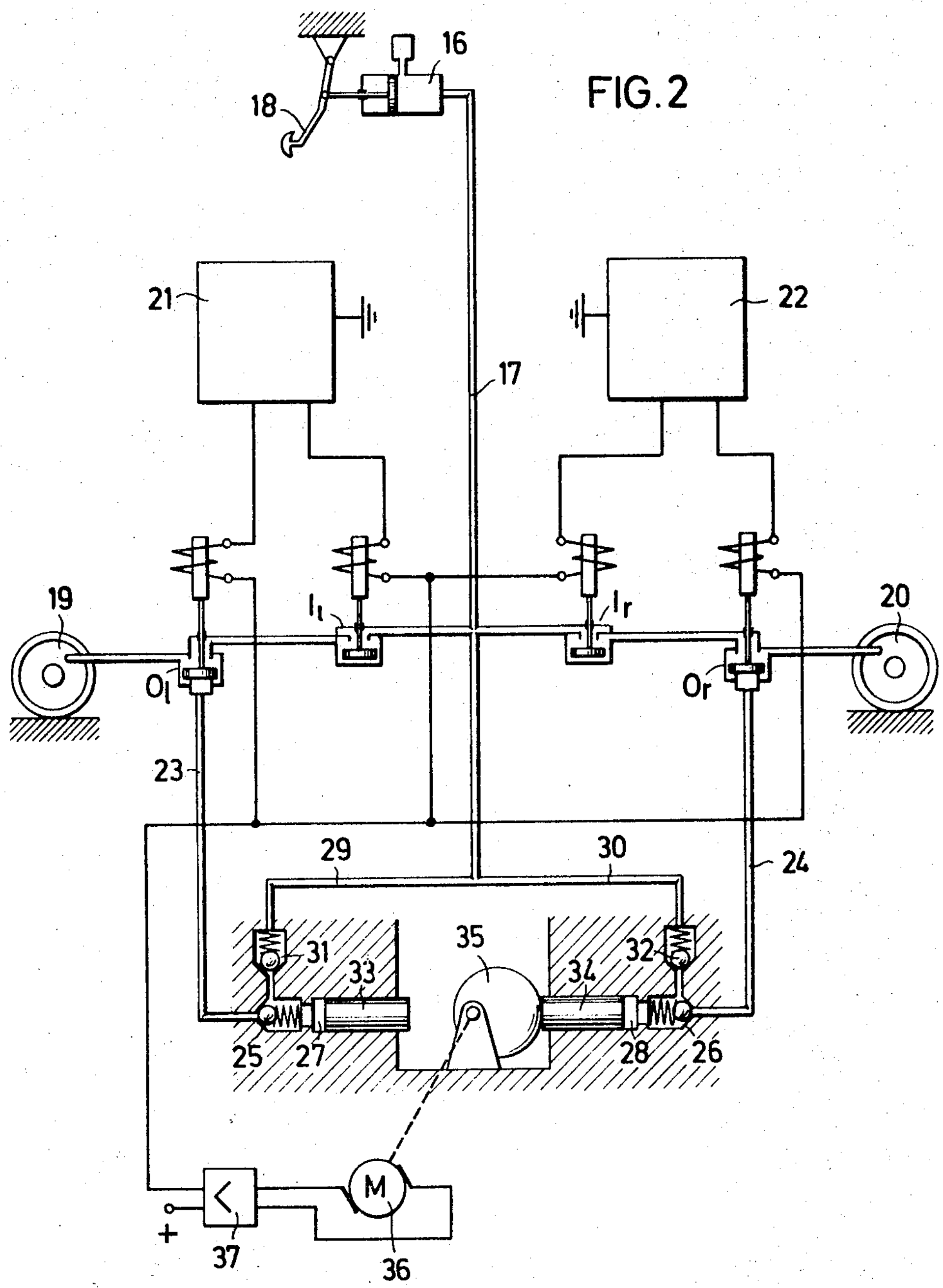
INVENTORS:
Heinz Leiber
Fritz Krümling
BY Spencer & Kaye
Attorneys

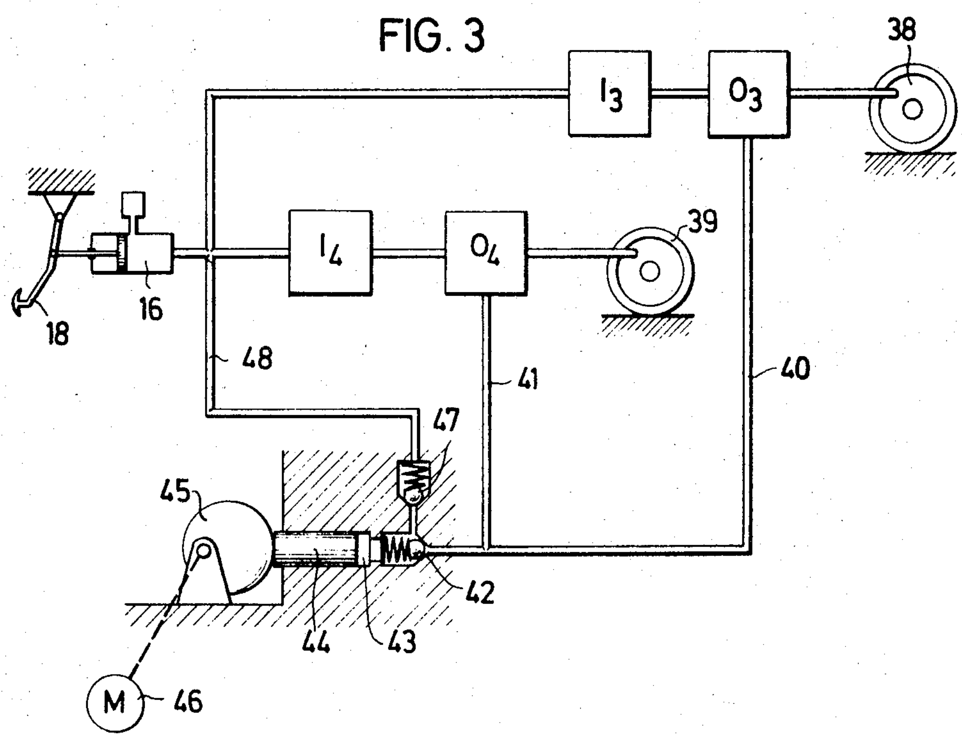
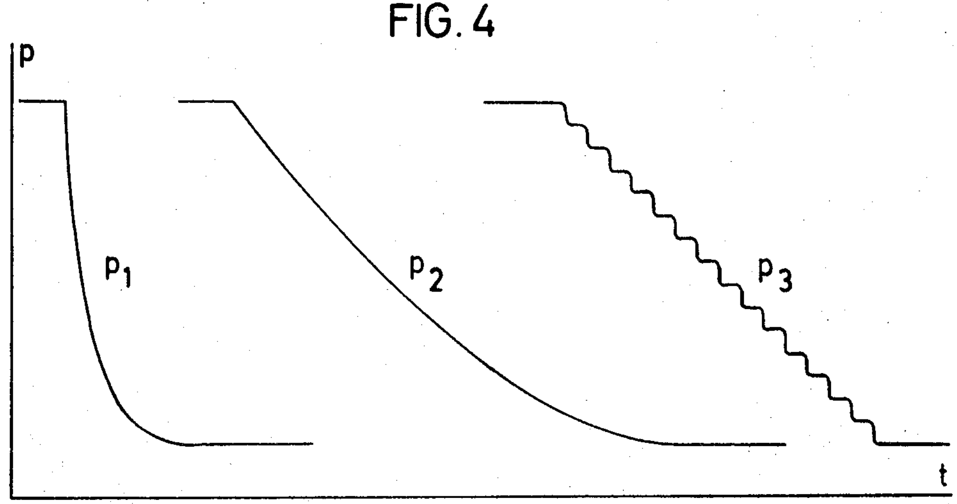
*INVENTORS:*
Heinz Leiber
Fritz Krümling
*BY* Spencer & Kaye
Attorneys INVENTORS
Heinz Leiber,
Fritz Krümling
BY Spencer & Kaye
ATTORNEYS

FLUID RETURN CIRCUIT FOR ANTILOCKING BRAKE SYSTEMS

BACKGROUND OF THE INVENTION

The present invention relates to antilocking control systems for fluid pressure actuated vehicle brakes employing a normally open inlet valve between the master cylinder and the wheel cylinder and a normally closed outlet valve which connects the wheel brake cylinder with an outlet line.

Such an outlet valve serves to reduce the pressure at the wheel cylinder during those periods of the control cycle when the wheel-associated acceleration and deceleration sensor causes closing of the inlet valve and opening of the outlet valve. During these periods the brake fluid supply of the master cylinder may be diminished unless some means is provided for returning the brake fluid to the master cylinder. If the brake fluid between the master cylinder piston and the wheel cylinders of the vehicle brakes is depleted, the brake pedal "sinks" and may have to be "pumped" in order to maintain the brakes in operation.

To overcome this problem, it has been proposed to provide a fluid return circuit to limit depletion of the brake fluid between the master cylinder piston and the wheel cylinders, which fluid return circuit includes a positive displacement pump for recycling the brake fluid.

Certain problems, however, arise in conjunction with such fluid return circuits. For example, the pump must be operated during brake application for a sufficient time to insure that serious brake fluid depletion does not occur. As a consequence, there is every likelihood that the pump will at certain times be operating when no or very little fluid is present to be returned and will consequently "run dry." This is true even if return fluid reservoirs are used upstream of the pump inlet, noting that in any event, one is limited to the amount of fluid which may be held in reserve before depletion reaches serious proportions.

Stated another way, it has been practically impossible to coordinate the operation of the pump with the requirement for return of fluid. It is conceivable, of course, that such coordination could be accomplished by sufficiently complex and cumbersome control devices but even if their cost and complexity could be tolerated, a malfunction might easily occur in the pump drive control such that it would remain in operation sufficiently long to "run dry."

The consequence of the pump running dry is that air may easily be sucked into the pump cylinder and from there conveyed into the brake fluid system and, as is well known, the presence of air in the brake system results in a "spongy" pedal and if present in sufficient amount may require "pumping" of the brake pedal in order to operate the brakes.

A further difficulty encountered in the operation of such systems is that the pump will often be switched on and off under full load, i.e., under conditions of full braking pressure in the main pressure line the outlet valve being open. Particular problems then exist with regard to handling the resulting high switchoff currents.

Another drawback of such systems is that each pressure circuit must have its own pump, drive motor and switch.

SUMMARY OF THE INVENTION

The present invention relates to an antilocking control system for vehicle brakes in which a fluid return circuit is provided, the return circuit including a positive displacement pump with drive means therefor which is effective only during the pumping portion of its working cycle. Thus, the drive means is incapable of drawing in brake fluid for subsequent return pumping thereof and, as a consequence, the pump can not run dry and thus will not introduce air into the brake fluid system.

More particularly, the present invention relates to a fluid return circuit as specified hereinabove wherein the pump includes a reciprocatable piston and the drive means therefor is effective to move the piston only in the direction of its working or pumping stroke, the return or induction stroke of the piston being effected only by the presence of brake fluid to be returned. The inlet to the pump is connected to the normally closed outlet valve of the antilocking control system so that the piston is forced to move in its induction stroke direction when the outlet valve is open and fluid is being bled from the main circuit of the brake system.

More specifically, the drive mechanism for the pump may be in the form of an eccentric rotated under the control of the system and which may engage one or more pump pistons or plungers to force them in their pumping direction if, and to the extent that, sufficient quantity of fluid to be returned is introduced into the pump chamber to extend the plunger or piston outwardly so as to be engaged by the eccentric.

BRIEF DESCRIPTION OF THE DRAWINGS

FIG. 2 is a diagrammatic view showing the brake pressure fluid and electrical circuits in conjunction with a modified form of the invention as related to a pair of vehicle wheels.

FIG. 3 is a view similar to FIG. 1 but showing a modified form of the circuit and also illustrating same associated with a pair of vehicle wheels.

FIG. 4 shows a series of curves depicting the pressure reduction in the brake system as a function of time for various arrangements.

DETAILED DESCRIPTION OF THE INVENTION

Figure 1:
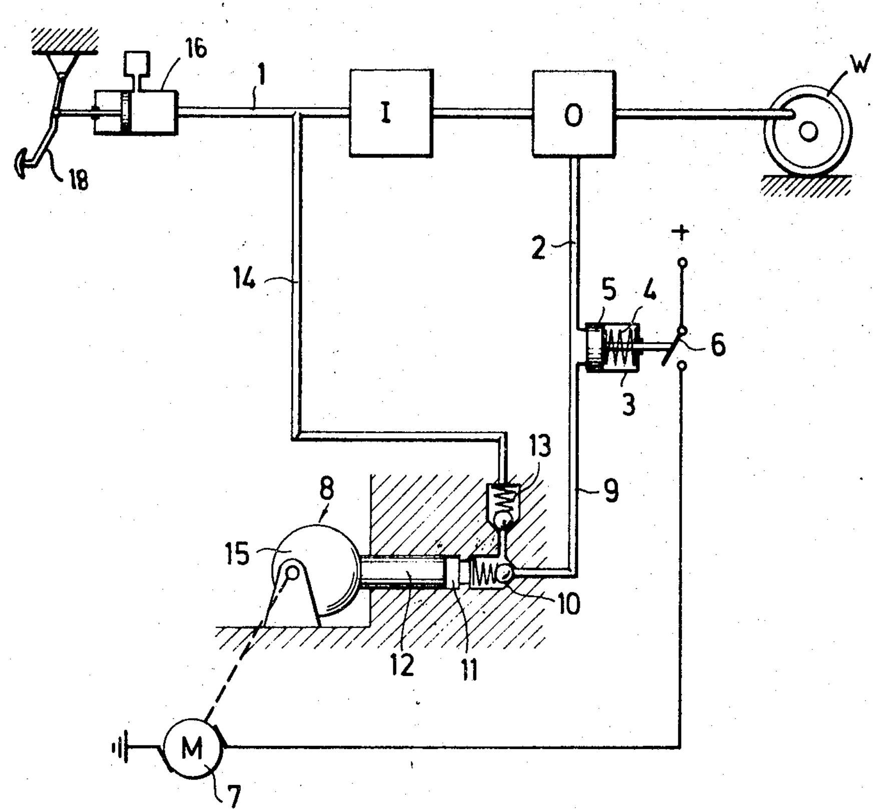
FIG. 1 is a diagrammatic view showing the brake fluid circuit according to one embodiment of the invention.

With reference to FIG. 1, an antilocking control system for vehicle brakes in shown schematically. As illustrated, the wheel W has a suitable slave cylinder actuated by hydraulic fluid pressure to operate the wheel-associated brake. The slave cylinder is coupled to the main hydraulic fluid pressure line 1 through the normally open inlet valve I and through an outlet valve O. The main pressure line 1 is connected to the usual master cylinder 16 actuated by means of the brake pedal 18 and when pressure initially builds up in the line 1, it is transmitted directly to the slave cylinder of the wheel W, the outlet valve O being in such position as to block the return line 2.

The antilocking control system includes an acceleration-deceleration sensor associated with the wheel W and associated circuitry for actuating the valves I and O. During the control cycle, a condition exists in which the inlet valve I is closed so that the pressure applied to the slave cylinder of the wheel W remains constant and, during another condition of the control cycle, the inlet valve I remains closed while the outlet valve O is opened to allow hydraulic fluid to be bled through the return line 2 to reduce the pressure at the slave cylinder for the wheel W and correspondingly to reduce the braking force applied to the wheel. It is to be understood that other and different valve conditions may exist but the latter condition is the one with which the present invention is principally concerned since, during the time that the outlet valve O is open brake fluid is being bled from the system, which fluid must be returned to the main pressure line 1 to prevent the pedal 18 from sinking as a result of progressive bleedoff during cyclic operation of the antilocking control system.

In the embodiment of FIG. 1, the bleed line 2 is connected to a reservoir 3 having a piston 5 therein and a spring 4 normally urging the piston to the left in FIG. 1. The conduit 9 connects the reservoir 3 through a check valve 10 to the inlet chamber 11 of a positive displacement pump which includes the reciprocatable piston 12 and associated drive mechanism 8 therefor. The return line for the fluid from the chamber 11 is through the check valve 13 and conduit 14 which is connected to the main pressure line 1.

When the control cycle has been repeated a number of times, sufficient fluid will be bled into the reservoir 3 to displace the piston far enough to close the switch 6, the motor 7 which actuates the drive means 8 will be energized to commence return pump drive operation. Upon the first opening of the outlet valve O, the piston 12 will be forced against the eccentric 15 which constitutes the drive in the embodiment shown and when the eccentric 15 is rotated, it will force the piston 12 to the right in FIG. 1 so as to expel fluid from the chamber 11, past the check valve 13 and back to the main pressure line 1. The return, or induction, stroke of the piston 12 is not controlled by eccentric 15 since there is no positive connection between the eccentric 15 and the piston 12. Therefore, return movement is imparted to the piston only as a consequence of the presence of fluid to be returned, which fluid causes the chamber 11 to fill and forces the piston 12 to the left. This operation will continue until the supply in the reservoir 3 is depleted at which time the contacts 6 will open and the pump drive mechanism 8 will be deenergized.

According to another embodiment of the invention, two outlet lines, for example those associated with the two wheels on the same axle, are associated with one common reservoir chamber. If one such chamber is provided for the front wheel brake systems and one chamber provided for the rear wheel brake systems, the pump unit may be provided with an additional piston in the manner to be described in greater detail below.

The utilization of a positive displacement type pump which is coupled to its drive mechanism only during its pumping or working stroke permits a system to be designed without a reservoir and such a system is shown in FIG. 2. In FIG. 2, the main pressure line from the master cylinder 16 is indicated by the reference character 17 and will be seen to be branched to operate the left and right wheels 19 and 20 at the front or rear axle of the vehicle. The branch lines pass respectively through the normally open inlet valves $I_l$ and $I_r$ and through the outlet valves $O_l$ and $O_r$ to the slave cylinders of the respective wheels 19 and 20. The bleed lines from the outlet valves $O_l$ and $O_r$ are indicated respectively by reference characters 23 and 24 and these lines are connected by respective check valve 25 and 26 to the inlet chambers 27 and 28 of a pair of positive displacement pumps having the respective pistons 33 and 34. The two pistons 33 and 34 are diametrically opposed with respect to the drive eccentric 35 which is coupled to the motor 36 for rotating this eccentric.

The electrical control circuits for the left and right wheels 19 and 20 are indicated schematically by reference characters 21 and 22 and, as shown, are connected to actuators for the various inlet and outlet valves to cause the requisite actuations thereof. The embodiment according to FIG. 2 also employs a drive for the motor 36 which is effective when any of the inlet or outlet valves is actuated and, for this purpose, the inlet and outlet valve circuits are connected in parallel to an amplifier 37 for energizing the motor 36.

The pressure return lines from the two positive displacement pumps illustrated in FIG. 2 are connected respectively through the check valves 31 and 32 and the lines 29 and 30 to the main pressure line 17 substantially as is shown. During control cycle operation, the motor 36 will be energized to rotate the eccentric 35 and whenever either of the outlet valves $O_l$ and $O_r$ are open to bleed fluid through their respective lines 23 and 24, the corresponding pistons 33 or 34 will move in the induction direction so as to be engaged by the eccentric 35 to then be moved by the eccentric to return fluid through either or both the lines 29 and 30 back to the main pressure line 17.

Whereas the embodiment of the invention shown in FIG. 2 employs a pair of positive displacement pumps and a common drive therefor, the embodiment according to FIG. 3 illustrates the possibility of utilizing a common pump for both the left and the right wheels 38 and 39.

The respective inlet and outlet valves for the left and right wheels 38 and 39 are indicated by $I_3$, $O_3$ and $I_4$, $O_4$. The bleed lines from the outlet valves $O_3$ and $O_4$ are indicated by 40 and 41 and are connected in common through the check valve 42 to the pump chamber 43 and the return line is constituted by the check valve 47 and conduit 48 to return the fluid back to the main pressure line. The pump piston 44 is actuated on its working stroke by means of the eccentric 45 coupled to the drive motor 46.

No specific energizing circuitry for the motor 46 is illustrated in FIG. 3 to emphasize the fact that any suitable control therefor may be provided. For example, the pump mechanism may be continuously operated in which case the motor 46 need not be a separate entity but may be the internal combustion engine which drives the vehicle and the eccentric 45 could be driven in any suitable fashion. For example, the eccentric could be formed on the camshaft or distributor drive shaft, or could be associated with the vehicle oil pump drive, or could be arranged in any fashion which may be desired. As a matter of fact, the particular type of drive for the eccentric 45 is a matter of little concern since the drive coupling to the piston 44, or plural pistons if they are used, is effective to actuate the piston or pistons only in their working direction and is incapable of effecting a vacuum in the pump chamber 43 so that no possibility exists for introduction of air into the brake fluid system as a result of operation of the return pump. Alternatively, the pump motor may be operated at any time the vehicle brake light switch is energized.

As hereinbefore, the system may be operated in conjunction with a reservoir such as is shown in FIG. 1 or it may be operated without a reservoir as is illustrated in FIGS. 2 and 3, although it is to be understood that the systems of FIGS. 2 and 3 may employ reservoirs if desired. However, certain advantages accrue as a result of eliminating the reservoir as will be explained now in conjunction with FIG. 4.

It will be realized that the pressure reduction occurring at the wheel slave cylinder as a consequence of opening the outlet valve to bleed fluid from the slave cylinder system will, under provision of a reservoir chamber, be dependent upon the constriction afforded by the outlet valve as the fluid flows into the bleed line and will also be a function of the viscosity of the brake fluid. Thus, if the viscosity of the brake fluid is low, as may be occasioned by its being at a relatively high temperature, the pressure drop may be relatively rapid as is illustrated by the curve $p_1$ in FIG. 4. FIG. 4 also illustrates in curve $p_2$ a much less rapid pressure drop which may occur in an identical system but wherein the viscosity of the brake fluid is much higher due to lower temperature thereof. If, therefor, a reservoir 3 is used as is shown in FIG. 1, no control over the slope of the pressure reduction curve may be exercised other than by altering the flow characteristics of the fluid in the bleed line and, in any event, the slope is temperature dependent and nonlinear. For more sophisticated fast response antilocking brake systems it is, however, desirable to have temperature-independent linear pressure slopes and moreover to have a possibility to adjust the slope according to certain car models or types of brake systems.

FIG. 4 illustrates, by curve $p_3$, the pressure reduction curve according to the present invention without the utilization of a reservoir. Each step of the curve $p_3$ is a function of the operation of the positive displacement return pump. Thus, considering FIG. 2, as the outlet valve $O_r$ opens, the pump chamber 28 fills and the piston 34 is forced to the left against the rotating eccentric 35, so that pressure reduction will occur. Then, when the eccentric starts to drive the piston 34 to the right, the pressure in the bleed line 24 and consequently at the slave cylinder for the wheel 20 will be held constant, due to valve 26 being closed, and so on for each cycle of operation of the pump.

Obviously the average slope of the pressure reduction curve $p_3$ will remain substantially constant over the entire pressure range because the height of the steps of the curve will remain constant, provided that the constrictions in the valves are wide enough and the cross section of the pipes is great enough. In this case the procedure of filling the chamber 28 is controlled only by the speed of rotation of the eccentric, that is the speed of the yielding movement of the piston 34 in FIG. 2, and not by the flow restrictions.

If the pump is rotated at a faster speed, the width of the steps of the curve $p_3$ will be smaller whereas if it is rotated at a slower speed the steps of the curve $p_3$ will be larger. The average slope of the pressure reduction curve will thus become greater and smaller respectively by controlling the speed of operation of the return pump. As a consequence, the braking characteristic of the wheel due to pressure reduction may be tailored to fit any desired criterion.

Figure 5:
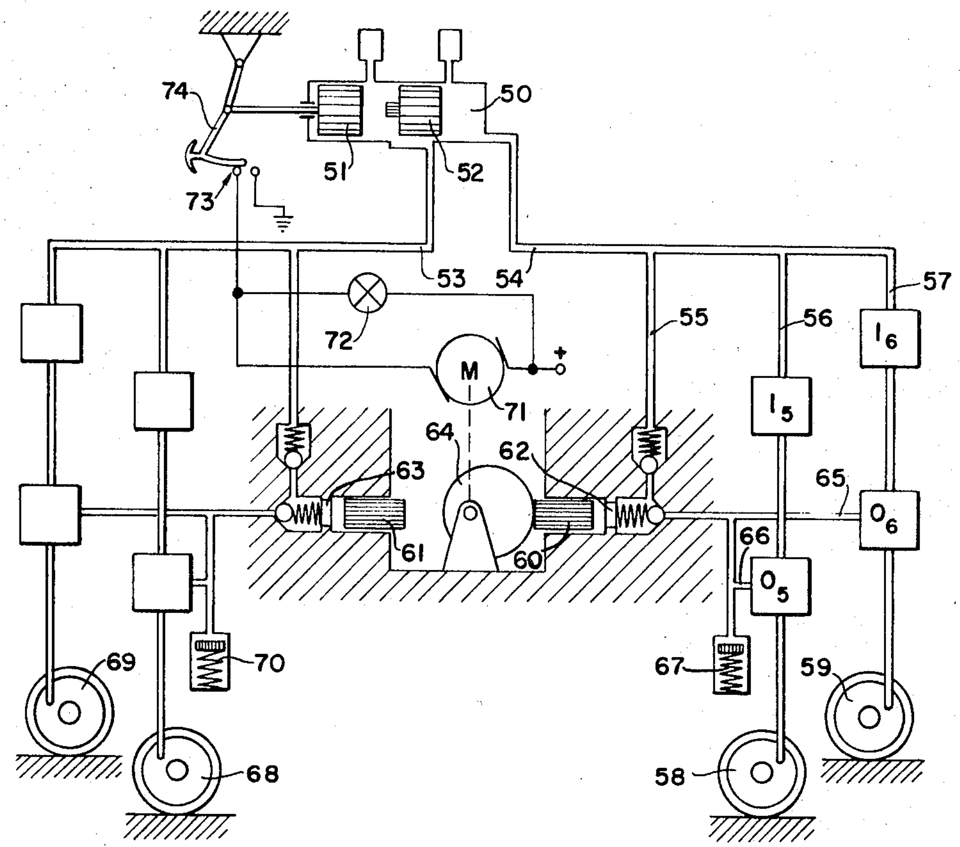
FIG. 5 shows another embodiment of the invention, having two independently controlled pressure circuits.

The brake control system shown in FIG. 5 is a so-called two pressure circuit system. A modified master cylinder 50 contains two pistons 51 and 52 controlling the main pressure lines 53 and 54 respectively. The main pressure line 54 has three branches, a return branch 55 and two feeding branches 56 and 57. The feeding branches are connected with the respective inlet and outlet valves of the wheels 58 and 59, the valves being indicated by $I_5$, $O_5$ and $I_6$, $O_6$. A central positive displacement pump is shown as having two pistons 60 and 61 mounted for reciprocation in two inlet cylinders 62 and 63. The pistons are driven by an eccentric 64. The whole double-piston pump with the necessary check valves is shown identical with the pump in FIG. 2, so that further detailed explanations may be omitted. The bleed lines 65 and 66 from the outlet valves $O_5$ and $O_6$ are connected commonly with a reservoir chamber 67 which is shown identical with the chamber 3 in FIG. 1. The common line is further connected through the respective inlet check valve with the inlet cylinder 62 of the pump, whereas this cylinder may be opened through the outlet check valve to the return branch 55.

On the left side of FIG. 5 the main pressure line 53 shows symmetrical connections with slave cylinders for wheels 68 and 69, with another reservoir chamber 70 and with the other inlet cylinder 63 of the pump. Both sides of FIG. 5 thus represent independent pressure circuits without any connection therebetween. A leak in one of the circuits resulting in a failure of the braking function at the wheels 58 and 59, for example the rear wheels of a car, does not influence therefor the braking function at the front wheels.

As in the foregoing embodiments of the invention, the eccentric 64 is driven by an electric motor 71. This motor is connected in parallel with the brake light 72 between the positive pole of the battery and the vehicle body. A brake light switch 73 within this connection is provided and shown as functional combined with a modified brake pedal 74. The motor may thus be operated at any time the brake pedal is pushed down.

Figure 6:
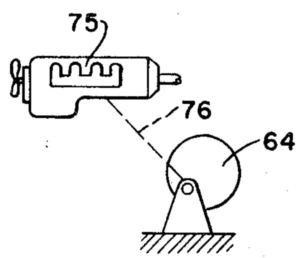
FIG. 6 shows a pump drive eccentric which is mechanically coupled with the vehicle internal combustion engine.

FIG. 6 shows an alternative drive for the eccentric 64. Here it is directly coupled, as shown schematically by the dashed line 76, with the internal combustion engine 75 of the car, so that for operation of the antilocking control system no electric motor and appended circuitry is needed.

The present invention, therefor, is well adapted to carry out the objects and attain the ends and advantages mentioned as well as others inherent therein.

It will be understood that the above description of the present invention is susceptible to various modifications, changes and adaptations.

We claim:

1. In an antilocking control system for vehicle brakes of the type having a brake fluid pressure source connected by a line to a wheel slave cylinder and including a fluid return unit and valve means in the line for selectively isolating the wheel slave cylinder from the pressure source and only then to connect the wheel slave cylinder thus isolated to the return unit to bleed off fluid from the salve cylinder to reduce fluid pressure, the improvement wherein said fluid return unit comprises, in combination:

positive displacement pump means having inlet chamber means and movable pumping means associated therewith;

inlet means connecting said inlet chamber means to the valve means for admitting fluid bled from the system into said chamber means so as to move said pumping means in its intake direction and containing a check valve arranged for allowing fluid to flow only from the slave cylinder to said chamber means;

separate outlet means connecting said inlet chamber means to the brake fluid pressure line for returning brake fluid thereto; and drive means for moving said pumping means only in the direction in opposition to its intake direction whereby to return fluid to the fluid pressure source.

2. An arrangement as defined in claim 1 wherein the fluid pressure line is provided with branches each having valve means, said inlet means connecting said valve means in common with said inlet chamber means.

3. An arrangement as defined in claim 1 wherein said inlet means includes a reservoir, said reservoir including a chamber, movable means in said chamber for allowing the accumulation of brake fluid therein.

4. An arrangement as defined in claim 3 further comprising means for energizing said drive means in response to accumulation of a predetermined quantity of fluid within said chamber.

5. An arrangement as defined in claim 1 including an inlet valve in series with said outlet valve; means for selectively actuating said valves; and means for energizing said drive means in response to actuation of at least one of said valves.

6. An arrangement as defined in claim 1 wherein said movable pumping means comprises a piston and said drive means comprises an eccentric engageable with said piston.

7. In an antilocking control system for vehicle brakes of the type having a brake fluid pressure source connected by a line to a wheel slave cylinder and including valve means in said line for selectively isolating the wheel slave cylinder from the pressure source and only then to connect said wheel slave cylinder thus isolated to a return unit to bleed off fluid from the slave cylinder to reduce fluid pressure, the improvement wherein said fluid return circuit comprises means for returning fluid which has been bled off to said fluid pressure line at a point upstream of said valve means, said means for returning fluid including pump means for positively circulating fluid only from said pump means to said fluid pressure source.

8. An arrangement as defined in claim 7 wherein said pump means comprises a piston and an eccentric for moving said piston in only one direction corresponding to the working stroke thereof.

9. An arrangement as defined in claim 7 wherein said control system is composed of a plurality of independently controlled pressure circuits, each circuit comprising a fluid pressure line with several branches being associated by said branches with more than one vehicle wheel, each branch having one outlet line and one outlet valve, each said outlet line being connected to its associated outlet valve, said arrangement further comprising a reservoir chamber, an inlet chamber and a pump piston for each said pressure circuit, one reservoir chamber and one inlet chamber being in common connected with all of said outlet lines of one said pressure circuit.

10. An arrangement as defined in claim 7 wherein said pump means are arranged to be operated in response to the closing of the brake light switch of the vehicle.

11. An arrangement as defined in claim 7 wherein said pump means are arranged to be driven by the engine of the vehicle.

* * * * *